Feb. 28, 1967 W. A. LIEN 3,306,993
SEALED ELECTRONIC DIGITAL SWITCHING STRUCTURE
Original Filed Jan. 22, 1963
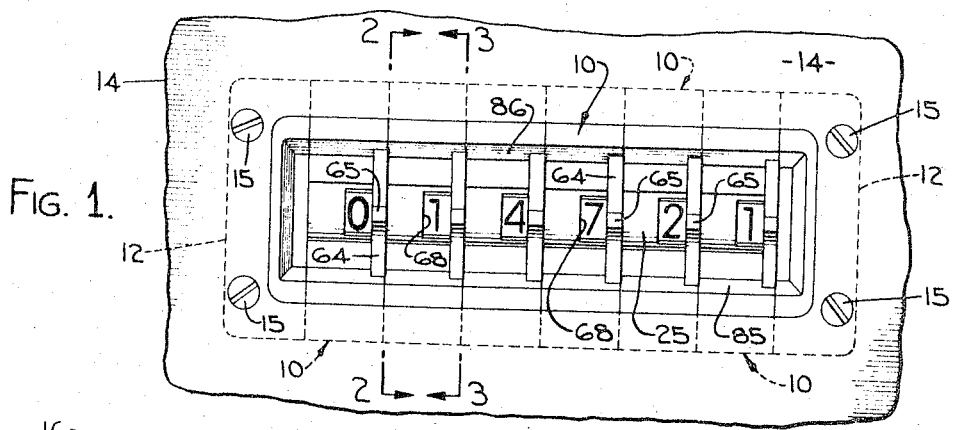
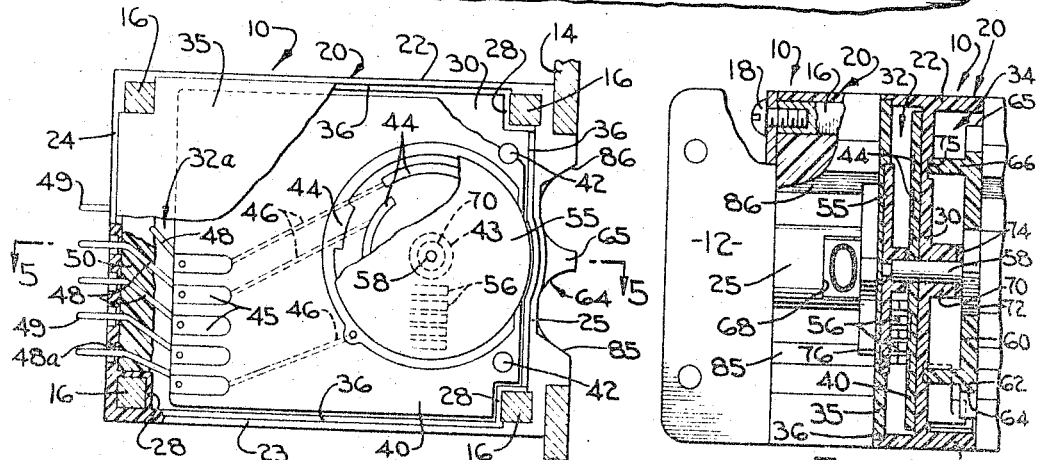
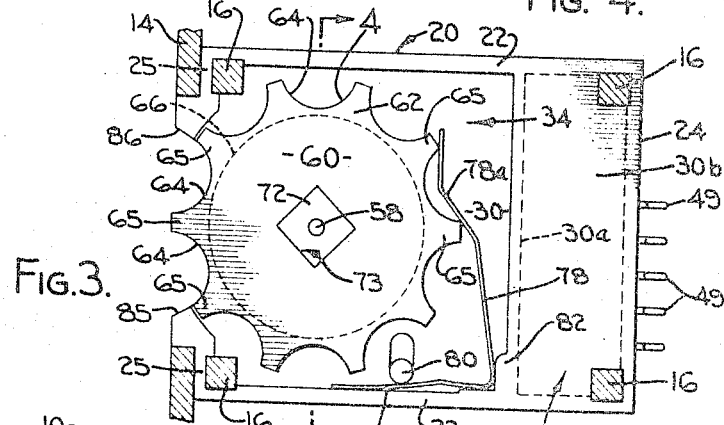
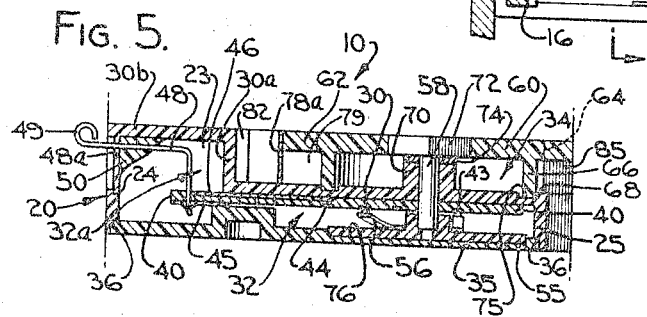
WALLACE A. LIEN
INVENTOR.
BY *[signature]*
ATTORNEY.

United States Patent Office 3,306,993
Patented Feb. 28, 1967

3,306,993
SEALED ELECTRONIC DIGITAL SWITCHING
STRUCTURE
Wallace A. Lien, Palos Verdes Estates, Calif., assignor to Endevco Corporation, Pasadena, Calif., a corporation of California
Continuation of application Ser. No. 253,228, Jan. 22, 1963. This application Aug. 30, 1965, Ser. No. 483,430
12 Claims. (Cl. 200—11)

This application is a continuation of application Serial No. 253,228, filed January 22, 1963, now abandoned. This invention relates to digital switching devices, and more particularly to the construction of each unit, a plurality of which units are commonly assembled in side-by-side relationship into an electrical switching assembly for the purpose of controlling appropriate electrical circuits.

An important object of this invention is to provide a digital switching unit which can operate successfully in severe environments.

Frequently digital switching units are required to operate in humid or other atmospheres which deleteriously affect electrical components used in the switch; for example, electrical brushes and contacts which are movable with respect to one another.

It is therefore a further object of the invention to provide a switch structure which includes a sealed chamber in which the electrical components are disposed and an adjacent open or unsealed space or chamber which necessarily communicates with the ambient atmosphere and contains a rotary digit-carrying counting or switching wheel, this wheel having a packed or sealed driving connection with the rotating brush device within the sealed chamber.

Other objects of the invention and various features of construction will become apparent to those skilled in this art upon reference to the following specification and the accompanying drawing wherein a desired construction is shown.

In the drawing:

FIG. 1 is an elevation of an assembly of sealed switching units constructed in accordance with this improvement and arranged in cooperative relationship;

FIG. 2 is a cross-section taken from the line 2—2 of FIG. 1;

FIG. 3 is a cross-section taken from the line 3—3 of FIG. 1;

FIG. 4 is a fragmentary vertical view partly in section along the axial plane indicated by the line 4—4 of FIG. 3, and indicating adjoining units partly in elevation and partly broken away to reveal internal structures; and FIG. 5 is a horizontal section taken approximately on the line 5—5 of FIG. 2

With reference to the drawing, FIG. 1 represents an assembly of several units 10 mounted on a panel to form an operative multiple circuit switching structure. These units 10 are aligned in the indicated assembled relation with angular end sections 12, the angular end sections 12 being secured to the panel 14 as by screws 15. The aligned assembly is retained by a series of through rods 16 extending through the units at their corners, and, in the form illustrated, being square in cross-section. Screws 18 extend through rearwardly directed flanges of the angular end sections 12 and are threaded into the ends of the square through rods 16.

Each of the units 10 comprises a casing or housing 20, preferably cast or moulded from an electrical insulating material such as any appropriate well-known thermosetting plastic resin. The casing 20 is moulded with a top wall 22, a bottom wall 23, a back wall 24, and a front wall 25. As seen especially in FIG. 2, the corners of the casing 20 are provided with small integral angular enclosure walls 28 to form square passages for receiving the through rods 16; these enclosure walls 28 appear at least at one side of the casing 20.

An important feature of this improvement is a sealed longitudinal partition 30 that is integral with the exterior casing walls 22, 23, 24 and 25, and that divides the resultant housing into two areas. A chamber 32 receives the electrical parts including both stationary and rotary contacts. This chamber is completely sealed. The other chamber or space 34, which is open and unsealed, receives purely mechanical operating parts that are in communication with the ambient atmosphere. In the structure illustrated, the partition 30 includes an integral transverse portion 30a integrally joined with a lateral longitudinal side wall portion 30b, all of which are integrally joined to the top and bottom casing walls 22 and 23, the rearward portion of the partition 30, thus being integrally joined to the back wall 24, especially as seen in FIGS. 3 and 5. This arrangement produces a well 32a at the rear of the chamber 32 which provides for conveniently sealing connectors 48 having projecting terminals or lugs 49 as described below.

In its completed form, each housing 20 includes an outside closure wall or plate 35 which, when installed, is inset on shoulders 36 (FIG. 2) at the corresponding outer edges of each of the walls 22, 23, 24 and 25. When so inset in a sort of counter-sunk relationship, the closure plate 35 is cemented or otherwise sealed in place upon the outer casing walls 22, 23, 24 and 25 and the small enclosing walls 28 for the through rods 16. With the sealed closure plate 35 in operative position as just described, the electrical parts receiving chamber 32, 32a, is sealed for the exclusion of air or other atmospheres, thereby guarding against damage to the electrical parts, now to be described, from exposure to ambient atmospheres.

Within the sealed electrical parts chamber 32, there is anchored a circuit board 40 of electrical insulation material. One end of this board 40 is conveniently anchored through the medium of studs 42 upstanding integrally from the partition 30 and snugly entering corresponding holes in the end of the circuit board. This board 40 may be a printed circuit board or otherwise as desired. In any event it carries on its face opposite from the partition 30 a plurality of mutually insulated segmental arcuate stationary contacts 44 as may be desired. To provide for decimal switching the segmental stationary contacts and a 360° slipring may be arranged at five radii as disclosed in copending patent application Serial No. 820,543, now Patent No. 3,089,923. At the rearward end of the circuit board 40 which overhangs the well 32a, the circuit board will typically carry appropriate electrical terminals 45 connected as desired with the contacts 44 through printed conductive leads 46, or otherwise.

For connection of the parts 44, 45, and 46 exteriorly of the casing 20 to apparatus with which the device is to be used, suitable connectors 48 extend from the circuit board terminals 45 through the rear wall 24 of the casing 20 as by way of small holes through relatively thin portions 48a of the back wall 24 to provide the external projecting terminals or lugs 49. These connectors 48 are readily passed through the thin wall portions 48a as the circuit board 40 is being installed in the position illustrated in FIG. 2. When the board 40 is anchored over the studs 42, the connectors 48 are thus disposed below the rearward end of the circuit board 40 and within the well 32a as best illustrated in FIG. 5, and as indicated in FIG. 2. For the purpose of sealing the connectors 48 in the back wall 24 and thereby anchoring the rearward end of the circuit board 40, the rearward portion of the well 32a is potted with a mass of appropriate sealing material 50 embedded around the inner parts of the connectors 48 and over their points of passage through the back wall 24 of the casing 20.

Operating in conjunction with the segmental contacts 44 on the circuit board 40, there is a rotary switch plate 55 carrying on its face opposing the contacts 44 a plurality of rotary contacts in the form of resilient brushes or wiper fingers 56 electrically connected together and appropriately mounted in known manner to perform the required switching functions. The rotary switch plate or rotor 55 is rigidly affixed to one end of a shaft 58 by which the rotary plate 55 is operated.

The operation of the rotary switch plate 55 through the shaft 58 is effected from a digit-carrying switching, or counter, wheel 60 rotatably mounted in the open space 34. This counter wheel 60 includes a peripheral radially directed finger flange 62, which, especially as seen in FIGS. 2 and 3, is arcuately notched at 64 to provide lever-like finger lugs 65 to be engaged by the operator's fingers for rotation of the wheel 60 by a tangential finger movement. The outer side wall or face of this wheel, when in operative position, is substantially flush with the corresponding outer edges of the walls 22, 23, 24 and 25 of the housing 20 and the outer lateral wall portion 30b of the sealing partition 30. The wheel 60 is set slightly within the casing 20 so that the wheel may rotate freely when another casing 20 is assembled alongside thereof as indicated in FIGS. 1 and 4. One of the fingers 56 of the rotor 55 is in constant contact with the slip ring 43. The remaining fingers are located at the radii of the stationary segmental contact 44 and contact appropriate segmental contacts only in certain angular positions of the switching wheel 60.

The inner side of the wheel 60 is provided with a concentric inwardly directed cylindrical rim or flange 66 which carries various digits, such as 0 to 9 of the decimal system, or other indicia, such as letters of the alphabet, as may be required, the employment of digits being indicated in FIG. 1. The wheel 60 is thus arranged to present to view a chosen digit or other indicium through a window 68 in the front wall 25 of the unit, as best indicated in FIGS. 1 and 4. The wheel 60 is non-rotatably mounted on the outer end of the drive shaft 58, whose opposite end carries the rotating switch plate 55, the shaft 58 being rotatably borne in a hub 70 integrally cast or moulded with the sealed partition wall 30. The shaft 58 extends through the circuit board 40 to the rotary switch plate 55, to which it is affixed, and may if desired be borne also in such circuit board.

The drive of the shaft 58 from the wheel 60, by means of a finger lug 65, is effected through a key 72 rigidly secured on the outer end of the shaft 58. This key 72 is here represented by a square nut-like device which, in the preferred form, removably fits into a square opening 73 in the wheel 60. While the rotary switch plate 55 is required to be rigidly fixed on the inner end of the drive shaft 58, it is sufficient if the wheel 60 is removably mounted on the key 72. For the purpose of maintaining the seal between the sealed chamber 32 and the open space 34, a sealing washer 74 bears against the end of the hub 70, being fitted under compression between the outer end of the hub 70 and the inner face of the key 72. Thus, means is provided for effecting a seal between the bearing 70 and the shaft 58. A sufficient amount of compression of the washer 74 to maintain the seal is effected through the medium of the brushes or wiper fingers 56 which are spring-like in nature. The resilient fingers are partially compressed in the chamber to provide sealing pressure as well as to maintain adequate wiping contact with the contact segments 44, as indicated above. In order to reduce the module width, the inward annular edge of the rim 66 is located in a counter-sunk annular track or groove 75, in the partition 30, thus enclosing a small annular space, as indicated in FIGS. 4 and 5. Similarly, the rotary switch plate 55 rides in a counter-sunk circular seat 76 in the closure plate 35 as also seen in FIGS. 4 and 5.

Since the outer closure plate 35 of the electrical parts chamber 32 is cemented or otherwise sealed in place and the various walls of the casing 20, including the partition 30, are integrally moulded or cast, the chamber is tightly sealed against entrance of air or other atmosphere, and the sealing washer 74, under the described conditions of construction, maintains this sealed condition. Various plastic materials, for example, employed for the washer 74 will serve for this purpose, a specific usable material currently available being known as "Teflon," that is a polytetrafluoroethylene. A reasonably close bearing fit of the shaft 58 in the hub 70 is an aid to effective sealing.

As seen in FIGS. 1 and 4, in this particular arrangement only one numeral is available for view at one time through the window 68 of a given unit 10, and such numeral lies alongside one of the finger lugs 65 of the respective wheel 60. In order to assure centering of the mentioned numeral in the window 68, a bent spring 78 is mounted in the space 34 at the rear thereof. The spring 78 includes a forwardly extending portion 79 which is fitted under a stop 80 to retain the spring in the operative position illustrated, the heel of the spring fitting against a back corner portion 82 of the cross wall 30a. For positioning the wheel 60, the upper end of the spring 78 is provided with an angularly offset portion 78a which drops into one of the finger notches 64 and engages the two adjacent finger lugs 65 thereby properly centering the appropriate digit brought into position.

According to the illustrated construction of the front wall 25 of the housing 20, there is provided a forwardly projecting sloping lower finger stop 85, as well as an upper sloping finger stop 86. These are respectively substantially aligned with a lower finger lug 65 and an upper finger lug 65 when the switching wheel 60 is in position centering a respective digit as disclosed and claimed in U.S. Patent No. 3,089,923. In this manner, when the operator's finger moves a finger lug 65 downward to a position to where the end of the operator's finger strikes the finger stop 85 with the switching wheel in the centered position, the spring 78 centers the corresponding digit. Similarly, if the wheel is being reversely rotated the upper stop 86 will be engaged by the operator's finger to center the appropriate digit in the window 68. It will be appreciated that the portion of the front wall 25 between the stops 85 and 86 closes the forward portion of the casing 20 except for the window 68.

From the foregoing, it will be apparent that a casing structure is presented for units of digital switching devices in which the electrical parts of each of these switching devices is housed in a chamber sealed from the atmosphere and in which the rotating switching wheel is open to the atmosphere is housed in another open space alongside the sealed chamber. By these means, damage to the electrical parts from injurious ambient atmospheres is avoided. Such a structure is of great advantage where such digital switching units are operated under severe atmospheric environments. It will also be apparent that a structure has been presented which is readily producible to effect complete sealing of the electrical components chamber 32, and whereby the chamber 32 is segregated from the unsealed mechanical parts space 34 housing the switching wheel 60. It will also be apparent that the construction for each of the present units is such that a series of units may be aligned as indicated in FIGS. 1 and 4, a sealed closure plate 35 of a unit to the right of a given unit acting to cover the mechanical parts space of a unit to the left, whereby to retain each switching wheel in operative position without the necessity for special or individual retention means therefor in its own structure.

Although only one specific embodiment of the invention has been described herein, it will be obvious that the invention is not limited thereto, but is capable of being embodied in many other forms. Various changes, which will suggest themselves to those skilled in the art, may be made in the material, form, details of construction, and arrangement of the parts without departing from the invention. For example, the switch contact segments may be arranged differently and the invention may be applied to switches having a different number of switch positions, such as 8, 10, 12, 16, and 37 positions. Similarly, the invention may be applied to switches incorporating other modifications. It is therefore to be understood that the invention is applicable to numerous modifications within the scope of appended claims.

The invention claimed is:

1. A digital switching unit including means defining a sealed electric parts chamber, relatively fixed first contact means mounted in said sealed chamber, relatively movable second contact means mounted in said sealed chamber in cooperative relation with said relatively fixed first contact means for making and breaking circuits, at least one of said first and second contact means including resilient contact means maintained in compression during said circuit making and breaking, a rotary switching wheel having finger engaging means to rotate the wheel, means defining an unsealed space adjoining said sealed chamber, rotatable shaft means journaled in a partition wall of said sealed chamber, said partition wall being located between said sealed chamber and said unsealed space, said wheel having a drum concentric with said shaft means and carrying indicia on the outer face thereof that is concentric with said shaft means, said unsealed space containing said rotary switching wheel and being partially defined by wall means providing an aperture through which said finger engaging means project and also providing a window for viewing a selected indicium in a radial direction relative to said shaft means, one end of said shaft means being coupled to said relatively movable second contact means for driving said second contact means in said sealed chamber with respect to said relatively fixed first contact means in said sealed chamber, said switching wheel being mounted in said unsealed space adjacent said partition wall and being attached to a portion of said shaft means protruding into said unsealed space for driving said shaft means and thereby said movable contact means, and seal means compressed about said shaft means and in engagement with the said partition wall for sealing said sealed chamber in the region of said shaft means journal.

2. A digital switching unit including first wall means defining an enclosed electric parts chamber, relatively fixed first contact means mounted in said enclosed chamber, relatively movable second contact means mounted in said enclosed chamber in cooperative relation with said relatively fixed first contact means for making and breaking circuits, at least one of said first and second contact means including resilient contact means maintained in compression during said circuit making and breaking, a rotary switching wheel having finger engaging means to rotate the wheel, means defining an unsealed space adjoining said enclosed chamber, said wall means including a partition wall located between said sealed chamber and said unsealed space, rotatable shaft means journaled in said partition wall, said wheel having a drum concentric with said shaft means and carrying indicia viewable radially from the outer face thereof, said finger engaging means including lugs extending radially outwardly beyond the outer face of said drum, said unsealed space containing said rotary switching wheel and being partially defined by second wall means providing an aperture through which said finger engaging means project and also providing a window for viewing a selected indicium in a radial direction relative to said shaft means, one end of said shaft means being coupled to said relatively movable second contact means for driving said second contact means in said enclosed chamber with respect to said relatively fixed first contact means in said sealed chamber, said switching wheel being mounted in said unsealed space adjacent said partition wall and being attached to a portion of said shaft means protruding into said unsealed space for driving said shaft means and thereby said movable contact means, and means including a sealing member encircling said shaft means and in engagement with the said partition wall for sealing said enclosed chamber against ambient atmosphere.

3. The structure of claim 2 wherein said first contact means are located within said sealed chamber closely adjacent said partition wall, and including supporting means comprising a rotary switch plate located in said sealed chamber at a position spaced from said partition wall, said second contact means comprising partially compressed spring fingers extending from said switch plate toward said partition wall into compressive engagement with said first contact means.

4. A digital switching unit including means defining a sealed electric parts chamber; relatively fixed electrical circuit means mounted in said sealed chamber; relatively movable switch means mounted in said sealed chamber in cooperative relation with said relatively fixed electrical circuit means for making and breaking circuits; said relatively movable switch means including resilient contact means maintained in compression during said circuit making and breaking; a rotary switching wheel carrying indicia, and having finger engaging means to rotate the wheel; means defining an unsealed space adjoining said sealed chamber, said unsealed space containing said rotary switching wheel and including means providing a window for viewing a selected indicium; rotatable shaft means journaled in a partition wall of said sealed chamber, said partition wall being located between said sealed chamber and said unsealed space, one end of said shaft means being coupled to said movable switch means for driving said movable switch means in said sealed chamber with respect to said relatively fixed circuit means in said sealed chamber, said switching wheel being mounted in said unsealed space adjacent said partition wall and being attached to a portion of said shaft means protruding into said unsealed space for driving said shaft means and thereby said movable switch means; said compressed resilient contact means being positioned in said sealed chamber to exert a force on said shaft means urging portions of said rotary switching wheel into firm sealing engagement with portions of said partition wall adjacent to and surrounding said journaled shaft.

5. The structure of claim 4 including ring-shaped seal means surrounding said shaft means at a position adjacent said partition wall, the force applied to said shaft means by said resilient second contacts being operative to place said seal means in compression between said switching wheel and a portion of said partition wall.

6. The structure of claim 4 wherein said rotary switching wheel includes an annular rim extending toward said partition wall, the exterior surface of said partition wall defining a countersunk groove adapted to receive said annular rim, the force exerted on said shaft means by said resilient second contacts being operative to hold said annular rim within said groove.

7. In a digital switching structure, a casing having wall means enclosing and defining a sealed chamber and also defining an unsealed chamber adjacent said sealed chamber, said wall means including a partition wall separating said sealed and unsealed chambers from one another, said partition wall including an upstanding hub portion extending away from said sealed chamber into said unsealed chamber, switch means located within said sealed chamber, said switch means including a plurality of first electrical contacts located at fixed positions within said sealed chamber, said switch means further including supporting means carrying a plurality of second electrical contacts for joint movement within said sealed chamber relative to said first contacts, shaft means attached to said supporting means and extending via said hub portion from said sealed chamber into said unsealed chamber, and a manually actuable rotary switching wheel located in said unsealed chamber and attached to end of said shaft means remote from said sealed chamber, said wheel being operative to effect rotation of said shaft thereby to effect movement of said second electrical contacts relative to said first electrical contacts, said second contacts being resilient to maintain switching engagement with said first contacts, and said resilient second contacts being so positioned in said sealed chamber as to apply a force to said shaft means and its attached switching wheel urging said switching wheel toward said sealed chamber into said sealing engagement with said hub portion.

8. The structure of claim 7 including ring-shaped seal means surrounding said shaft means in said unsealed chamber at a position between said hub portion and said switching wheel, the force applied to said shaft means by said resilient second contacts being operative to place said seal means in compression between said switching wheel and said hub portion.

9. The structure of claim 7 wherein said partition wall includes first and second planar wall portions located in different spaced planes and interconnected to one another by an integral wall portion extending transverse to said spaced planes, said wall means and said partition wall defining a sealed chamber having a first relatively narrow sealed chamber portion adjacent one of said partition wall planar portions and a second relatively wider sealed chamber portion adjacent the other of said partition wall planar portions, said supporting means and said second electrical contacts being located in said relatively narrow sealed chamber portion, said first electrical contacts being mounted on a circuit board extending from said relatively narrow chamber portion at least partially into said relatively wider chamber portion, and a plurality of further contacts extending through said wall means in sealed relation thereto adjacent a portion of said relatively wider sealed chamber portion, said further contacts being electrically connected to said first contacts in said relatively wider sealed chamber portion and including contact portions exterior of said wall means for making electrical connections to said switch means.

10. A digital switching unit including wall means defining an enclosed electric parts chamber; first switch means including fixed electrical conductor means mounted in said enclosed chamber; second switch means including movable electrical conductor means mounted in said enclosed chamber in cooperative relation with said fixed electrical conductor means for making and breaking circuits; at least one of said first and second switch means including contact means resiliently engaging the other of said first and second switch means during said circuit making and breaking; a rotary switching wheel carrying indicia, said wheel having radially extending finger engaging means to rotate the wheel; means defining an unsealed space adjoining said enclosed chamber, said unsealed space containing said rotary switching wheel and including means providing a window for viewing a selected indicium; a rotatable shaft; said wall means including a partition wall located between said enclosed chamber and said unsealed space, said partition wall including an integral hub acting as a journal for said shaft, said shaft extending through said partition wall via said hub, said hub providing the sole opening in said enclosed parts chamber capable of communicating the interior of said chamber with the ambient atmosphere around said chamber, sealing means surrounding said shaft for sealing said shaft to said hub while permitting rotation of said shaft thereby to completely seal said parts chamber against ambient atmosphere, one end of said shaft extending into said sealed chamber and being coupled to said movable conductor means for rotating said movable conductor means in said sealed chamber with respect to said fixed conductor means in said sealed chamber, the other end of said shaft extending into said unsealed space, said switching wheel being mounted in said unsealed space adjacent said partition wall and being in driving engagement with said other end of said shaft for rotating said shaft and thereby said movable conductor means.

11. A digital switching unit including wall means defining at least a portion of a sealed electric parts chamber, a circuit board supported by said wall means and having a plurality of printed circuit conductors thereon mounted in at least one circular array facing the interior of said chamber to define relatively fixed first contact means disposed within said sealed chamber, a rotary switch plate mounted in said sealed chamber and having second contact means thereon movable with said switch plate and disposed in facing cooperative relation with said relatively fixed first contact means for making and breaking circuits, said wall means including a partition wall having an integral hub extending away from said chamber in alignment with the axis of rotation of said rotary switch plate, a rotary switching wheel disposed adjacent the exterior of said partition wall in coaxial relation with said hub and switch plate, said switching wheel having finger engaging means to rotate the wheel, rotatable shaft means journaled in said partition wall of said sealed chamber via said hub, seal means surrounding said shaft means and compressibly engaging a portion of said hub for sealing said sealed chamber in the region of said shaft means journal, one end of said shaft means being coupled to said rotary switch plate for driving said movable second contact means in said sealed chamber with respect to said relatively fixed first contact means in said sealed chamber, said switching wheel being attached to the other end of said shaft means at a position exterior of said sealed chamber for rotating said shaft means and thereby said movable contact means, said switching wheel having a disk portion spaced from said partition wall and a drum integral with said disk portion concentric with said shaft means and extending toward said partition wall around said hub, said drum carrying indicia on the outer face thereof that is concentric with said shaft means and hub, and further wall means adjacent the exterior of said sealed chamber providing an aperture through which said finger engaging means project and also providing a window for viewing a selected indicium on said drum in a radial direction relative to said shaft means.

12. A digital switching unit including first wall means defining at least a portion of an enclosed electric parts chamber; a circuit board having fixed electrical conductor means mounted thereon facing the interior of said enclosed chamber; a rotary switch plate mounted in said chamber and carrying movable electrical conductor means in facing engagement with said fixed electrical conductor means for making and breaking circuits; a rotary switching wheel carrying indicia and having radially extending finger engaging means to rotate the wheel; second wall means disposed adjacent the exterior of said enclosed chamber, said rotary switching wheel being positioned exterior of said enclosed chamber adjacent said second wall means, said second wall means providing a window for viewing a selected indicium and also providing an aperture through which said finger engaging means project, said first wall means including a partition wall extending transverse to said second wall means, a rotatable shaft, said partition wall including means acting as a journal for said shaft, said shaft extending through said partition wall via said journal, said journal comprising the sole opening in said enclosed parts chamber capable of communicating with the ambient atmosphere, sealing means surrounding said shaft for sealing said parts chamber against ambient atmosphere while still permitting rotation of said shaft, one end of said shaft extending into said sealed chamber and being coupled to said rotary switch plate for driving said movable conductor means in said sealed chamber with respect to said fixed conductor means in said sealed chamber, said switching wheel being in driving engagement with said other end of said shaft for rotating said shaft and thereby said switch plate and movable conductor means.

No references cited.

ROBERT K. SCHAEFER, *Primary Examiner.*

R. S. SCOTT, *Assistant Examiner.*